United States Patent Office 3,730,747
Patented May 1, 1973

3,730,747
PIGMENT FORMULATIONS
Horst Belde and Ewald Daubach, Ludwigshafen, Germany, assignors to Badische Anilin- & Soda-Fabrik Aktiengesellschaft, Ludwigshafen (Rhine), Germany
No Drawing. Filed Jan. 8, 1971, Ser. No. 105,094
Claims priority, application Germany, Jan. 14, 1970,
P 20 01 459.9
Int. Cl. C08h 17/04, 17/14
U.S. Cl. 106—288 B                                6 Claims

ABSTRACT OF THE DISCLOSURE

Pigment formulations containing pigments, zinc chloride and water, which are eminently suitable for the mass-dyeing and spin-dyeing of polyacrylonitrile from aqueous concentrated salt solutions.

---

This invention relates to new pigment formulations containing pigments, zinc chloride and water and to the use of such formulations for the mass-dyeing and spin-dyeing of acrylonitrile polymers.

The new and useful pigment formulations contain (A) from 10 to 50% and preferably from 15 to 35% by weight of a pigment,
(B) from 45 to 80% and preferably from 45 to 70% by weight of zinc chloride and
(C) from 4 to 30% and preferably from 10 to 20% by weight of water.

The new pigment formulations may contain both inorganic pigments such as titanium dioxide or carbon black, and organic pigments such as those of the azo, phthalocyanine, indigo, anthraquinone, quinacridone or perylene series. They may also contain mixtures of different pigments, for example mixtures of inorganic and organic pigments.

The novel formulations are produced for example by subjecting a mixture of pigment, zinc chloride and water to shearing forces such as occur in a kneader, at about 140° C. In carrying out this process the amount of water used may be initially limited or reduced by distillation such that the water content of the material being kneaded is, for example, from 2 to 10% by weight, in order to achieve a satisfactory degree of subdivision. When using this procedure the required state of subdivision is achieved after from 1 to 3 hours for example. The desired state of subdivision is that at which the particle size does not exceed 2µ as measured microscopically.

The concentrations of water in the formulation is then adjusted to the required level, in order to obtain the formulation in the form of a paste.

The pigment formulations of the invention are highly disperse and stable and possess excellent tinctorial properties. The favorable results are surprising, since it is well known that the addition of inorganic salts to highly disperse aqueous pigment dispersions causes flocculation of the pigment.

The new formulations are eminently suitable for the mass-coloration and spin-dyeing of acrylonitrile polymers which are converted to fibers or film from, say, concentrated aqueous solutions of inorganic salts such as zinc chloride or sodium thiocyanate or from concentrated nitric acid. To this end the formulations are incorporated, by known techniques, into the acrylonitrile polymer spinning solution to be subsequently spun to filaments or fibers. The spun-dyed filaments thus produced show uniform distribution of the pigment and their mechanical properties are unaffected.

In the following examples the parts and percentages are by weight.

EXAMPLE 1

140 parts of zinc chloride are placed in a trough-type kneader equipped with heating means. The contents of the kneader are heated to 90–95° C. and 219 parts of aqueous press cake containing 27.4% of copper phthalocyanine pigment (α form) are added in 4 portions. Sufficient water is evaporated to provide a compact, hard kneading composition, as is obtained at a water content of from 5 to 10%, whereupon kneading is continued for a further hour without heating. Toward the end of the kneading period sufficient water is added to provide a pasty composition.

The resulting formulation contains 62.0% of zinc chloride, 26.5% of copper phthalocyanine and 11.5% of water. Pasty formulations are also obtained when the water content is adjusted to from 10 to 15%.

EXAMPLE 2

175 parts of zinc chloride and 10 parts of water are placed in a trough-type kneader. Following the addition of 75 parts of copper phthalocyanine powder (β form), the mixture is kneaded for 2 hours as described in Example 1. At the end of the kneading period the temperature of the kneaded composition is 128° C. This is diluted with 55 parts of water while still in the kneader.

The resulting pigment preparation contains 55.7% of zinc chloride, 23.8% of copper phthalocyanine and 20.5% of water.

EXAMPLE 3

175 parts of zinc chloride and 14 parts of water are placed in a trough-type kneader. 75 parts of the pigment described in German Pat. 1,257,096 are added and the mixture is kneaded for 1 hour. At the end of the kneading period the temperature of the mixture is 73° C. The mixture is diluted with 38 parts of water while still in the kneader to form the required formulation.

EXAMPLE 4

175 parts of zinc chloride and 30 parts of water are placed in a trough-type kneader. 75 parts of indigo powder are added and the mixture is kneaded for 1 hour. At the end of the kneading period the temperature is 115° C. The composition is diluted with 68 parts of water while still in the kneader to form the desired formulation.

EXAMPLE 5

107 parts of titanium dioxide as rutile and 250 parts of zinc chloride are mixed for 30 minutes in a trough-type kneader. After the addition of 6.5 parts of water the mixture is kneaded for a further hour. At the end of the kneading period the temperature is 62° C. The composition is diluted with 8 parts of water to provide the required formulation.

EXAMPLE 6

175 parts of zinc chloride and 75 parts of a pigment obtained by condensing perylenetetroic acid with 4-aminoazobenzene are mixed in the dry state in a trough-type kneader. After the addition of 4 parts of water the mixture is kneaded for 1 hour, during which period the temperature rises to 110° C.

A further 5 parts of water are kneaded into the composition to give the desired pasty formulation. If desired, this may be further diluted with a 60% aqueous zinc chloride solution.

EXAMPLE 7

175 parts of zinc chloride and 20 parts of water are mixed in a trough-type kneader. 75 parts of Color Index Pigment Red 112 (Color Index No. 12,370) are then added in 3 portions and the mixture is kneaded for 1 hour.

The kneaded mixture attains a temperature of 80° C. during this period. The pigment concentration of the formulation is adjusted to 20% by kneading in 110 parts of water.

We claim:
1. A pigment formulation for the spin-dyeing or mass-dyeing of acrylonitrile polymers which consists essentially of
   (A) from 10 to 50% by weght of a pigment,
   (B) from 45 to 80% by weight of zinc chloride and
   (C) from 4 to 30% by weight of water,
based on the total weight of A, B and C together.
2. A pigment formulation as claimed in claim 1 consisting essentially of
   (A) from 15 to 35% by weight of a pigment,
   (B) from 45 to 70% by weight of zinc chloride and
   (C) from 10 to 20% by weght of water,
based on the total weight of A, B and C together.
3. A pigment formulation as claimed in claim 1 wherein component A is an inorganic pigment.
4. A pigment formulation as claimed in claim 1 wherein the pigment is selected from the group consisting of titanium dioxide, carbon black, azo dyes, phthalocyanine dyes, indigo dyes, anthraquinone dyes, quinacridone dyes and dyes of perylenetetroic acid.
5. A pigment formulation as claimed in claim 1 wherein component A is an organic pigment.
6. A pigment formulation as claimed in claim 1 with a particle size which does not exceed $2\mu$ is measured microscopically.

References Cited
UNITED STATES PATENTS

| | | | |
|---|---|---|---|
| 2,940,830 | 6/1960 | Thornhill | 106—292 |
| 3,253,877 | 5/1966 | Straley et al. | 264—206 |

JAMES E. POER, Primary Examiner

U.S. Cl. X.R.
106—288 Q, 292, 307